US005249234A

United States Patent [19]

Butler

[11] Patent Number: 5,249,234

[45] Date of Patent: Sep. 28, 1993

[54] COVER FOR BEHIND-THE-EAR TYPE HEARING AIDS AND METHODS OF MAKING AND USING THE SAME

[76] Inventor: Michael J. Butler, 5629 E. Tabor Dr., Castle Rock, Colo. 80104

[21] Appl. No.: 851,902

[22] Filed: Mar. 16, 1992

Related U.S. Application Data

[63] Continuation-in-part of Ser. No. 775,079, Oct. 11, 1991.

[51] Int. Cl.[5] .................... G06K 9/00; H04R 25/00

[52] U.S. Cl. .................... 381/69; 381/189

[58] Field of Search .................... 381/68, 69, 189, 72; 206/5; 150/154, 165

[56] References Cited

U.S. PATENT DOCUMENTS

D. 273,455 4/1984 Teitelbaum et al. .
1,250,690 12/1917 Stallings .
2,582,640 5/1950 Maddox .
2,840,081 6/1958 Moose .
2,840,082 6/1958 Salvatore .
4,572,179 2/1986 Teitelbaum et al. .
5,183,953 2/1993 Anderson et al. .................. 150/154

OTHER PUBLICATIONS

"Hearing Aid Filter" flyer and cover letter dated May 30, 1992 from Richard A. Hughes.

*Primary Examiner*—Jin F. Ng
*Assistant Examiner*—Sinh Tran

[57] ABSTRACT

A cover for BTE (behind-the-ear) hearing aids includes a hollow latex body configured similar to, but slightly smaller than, an arcuate BTE hearing aid. The cover possesses a larger quadrilateral closed end and a smaller open end. Opposite arcuate planar sidewalls are connected by a convexly curved top wall and a concavely curved bottom wall. The quadrilateral closed end extends transversely between the sidewalls and the top and bottom walls. The sidewalls and top and bottom walls taper and merge smoothly at the open end to form a circular opening. The cover is formed by dipping a complimentary shaped former into a liquid latex mixture, curing the latex to form a solid cover, and removing the cover from the former. In use, prongs of an expander tool are inserted into the open end of the cover, the prongs are then moved apart to mechanically stretch the cover, the BTE hearing aid is then inserted into the open end of the cover, and the cover is relaxed and allowed to conform closely to the outer surface of the hearing aid, preventing damage by moisture and other contaminants.

9 Claims, 8 Drawing Sheets

COVER FOR BEHIND-THE-EAR TYPE HEARING AIDS AND METHODS OF MAKING AND USING THE SAME

RELATED APPLICATIONS

This application is a continuation-in-part of U.S. patent application Ser. No. 07/775,079, filed Oct. 11, 1991.

BACKGROUND OF THE INVENTION

1. Field Of The Invention

The present invention relates to hearing aids, and more particularly pertains to an improved cover for BTE hearing aids (behind-the-ear) of the type possessing an arcuately curved microphone, amplifier and control portion adapted to be worn externally over the upper rear portion of a user's ear. This conventional type of hearing aid includes an in-ear mold connected to the amplifier and control portion by a sound tube for transmitting amplified sounds to the user's ear. BTE hearing aids are typically used by individuals having a relatively severe hearing loss which can not be corrected by the smaller in-ear and ear canal insertable type hearing aids. Accordingly, such externally worn BTE hearing aids are susceptible to exposure to moisture and other contaminants. The case of a BTE hearing aid houses sensitive microphone, amplifier, controls and battery components of the hearing aid. The hearing aid case is not hermetically sealed, but rather includes openings and cracks adjacent the volume control wheel, on/off switch and battery compartment door. BTE hearing aids are frequently exposed to moisture from ambient humidity, precipitation, perspiration, shower or bath water, and other contaminants such as dust and hair care products. Such moisture and other contaminants can and frequently do enter the case through the various cracks, damaging the internal circuitry and switches of the hearing aid, principally by promoting corrosion, necessitating expensive repair or replacement. A typical BTE hearing aid costs about $700.00, with an average repair costing more than $100.00 and taking at least one week, during which time the user is deprived of the hearing aid. As there are currently six to eight million BTE hearing aids in use in the United States, and one and a half million new BTE hearing aids sold annually in the United States, the prevention of damage to BTE hearing aids from moisture and other contaminants is of substantial interest.

2. Description of The Prior Art

The problem of damage to BTE hearing aids caused by moisture and other contaminants has been well known for several decades. Yet, no practical workable solution to the problem has been available in the market, until the introduction of the hearing aid cover of the present invention. Prior art solutions to the problem have been found unsatisfactory for a variety of reasons. One proposed solution, currently available on the market, involves wrapping the hearing aid case with a narrow elongated plastic wrap strip. This proposed solution has not been found satisfactory, because the openings in the resulting wrapping formed at the overlapping edges of the helical windings tend to induce moisture into the interior of the wrapping and into the hearing aid case by the mechanism of capillary action. Additionally, the volume control wheel and on/off switch of the hearing aid can not be operated without removing the plastic wrapping. Another prior art proposal addressed to the problem involved dipping the hearing aid case into a liquid plastic in an effort to form a seal. This method was found unsatisfactory because the liquid plastic was induced by capillary action into the cracks of the hearing aid case, obstructing operation of the volume control wheel and on/off switch. Additionally, because many BTE hearing aids use air activated zinc batteries which must have exposure to air to work, this method proved unsatisfactory because the liquid plastic sealed the battery compartment, resulting in battery failure. Accordingly, the most common method employed by BTE hearing aid users to attempt to minimize moisture damage to their hearing aids involves placing the hearing aid into a closed container with silica gel, a granular material which absorbs moisture. Of course, this method does not prevent the induction of moisture into the hearing aid case while in use, but merely attempts to remove the moisture as rapidly as possibly during periods of non-use thus minimizing the amount of corrosion and other damage sustained by the hearing aid.

SUMMARY OF THE INVENTION

In order to solve the problem of moisture and contaminant damage to BTE hearing aids, and to achieve other objects of the invention set forth hereinafter, the present invention provides a cover for BTE (behind-the-ear) hearing aids which includes a hollow latex body configured similar to, but slightly smaller than, an arcuate BTE hearing aid. The cover possesses a larger substantially quadrilateral closed end and a smaller open end. Opposite arcuate planar sidewalls are connected by a convexly curved top wall and a concavely curved bottom wall. The substantially quadrilateral closed end extends transversely between the sidewalls and the top and bottom walls. The sidewalls and top and bottom walls taper and merge smoothly adjacent the open end to form a circular opening. The cover is formed by dipping a complimentary shaped former into a liquid latex mixture, curing the latex to form a solid cover, and removing the cover from the former. In use, prongs of an expander tool are inserted into the open end of the cover, the prongs are then moved apart to mechanically stretch the cover the BTE hearing aid is then inserted into the open end of the cover, and the cover is relaxed and allowed to conform closely to the outer surface of the hearing aid, preventing damage by moisture and other contaminants. The cover may be formed in a variety of sizes to accommodate various different conventional BTE hearing aids. Preferred formers for producing "LARGE", "MEDIUM" and "SMALL" size covers are disclosed, for use with the three most common sizes of conventional BTE hearing aids.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION OF THE PREFERRED EMBODIMENT(S)

Figure 1:
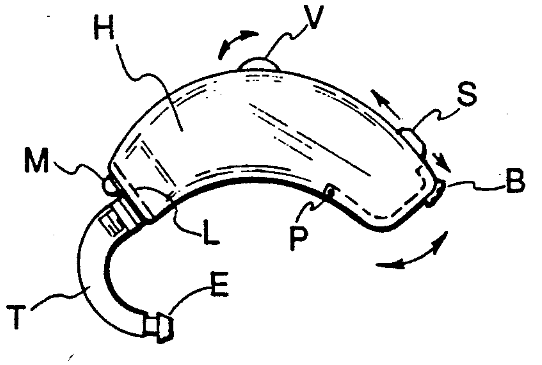
Fig. 1 (PRIOR ART)
FIG. 1 is a side elevational view of a conventional BTE hearing aid.

Referring now to the drawings, wherein like reference numerals designate corresponding structure throughout the views, and referring in particular to FIG. 1, a typical conventional BTE (behind-the-ear) hearing aid H includes an arcuately curved housing adapted to be worn on the upper rear surface of a user's ear. The case of the hearing aid houses sensitive electrical amplifier, control, battery, circuitry and switching components of the hearing aid. A microphone M disposed on the front end face of the hearing aid H picks up ambient sound waves and transmits them to the electrical components of the hearing aid for selective filtering and amplification. The filtered and amplified output is transmitted through a sound tube T terminating at a distal end E adapted for connection to a custom molded ear insert (not shown) worn in the user's ear. Recent technological advances have resulted in a miniaturization of hearing aids, such that many individuals with hearing loss can effectively employ ear inserted or ear canal inserted type hearing aids, rather than BTE hearing aids. However, such miniature hearing aids are not suitable for use by individuals with severe hearing loss. The BTE hearing aid H includes a rotatable volume wheel control V and a slidable on/off switch S projecting from the top surface of the case for manual manipulation by a user. A battery compartment door B is mounted by a pivot pin P between the illustrated closed position and an open position allowing access to a battery compartment through the rear end face of the hearing aid case. One very common type of hearing aid battery, air activated zinc, requires some exposure to air in order to maintain a chemical reaction which produces electrical current. Air enters the small cylindrical disc shaped air-zinc battery through one or more pin holes formed through the metal case of the battery. Accordingly, the battery compartment door B is not sealed, but rather is vented to allow air to reach the enclosed battery. As a result of this typical construction, entry points for moisture into the hearing aid case are formed around the volume wheel V, the switch S, as well as the battery compartment door B. Other common types of hearing aid batteries contain mercury or radium, both of which are toxic if ingested. Because such batteries are small, there is a constant danger that they will be removed from the hearing aid case and ingested by young children who wear or otherwise have access to BTE hearing aids. As such, it is desireable to provide a cover for the hearing aid H which reduces the accessibility of the battery within the battery compartment of the hearing aid to young children.

Figure 5:
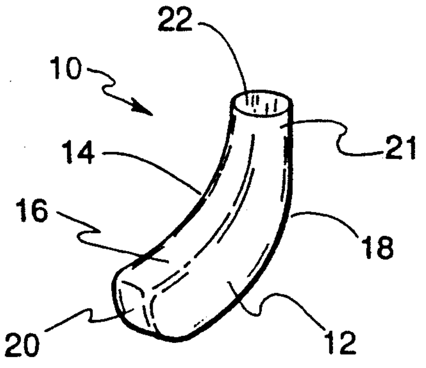
FIG. 5 is a perspective view illustrating a large size cover of the present invention.
Figure 6:
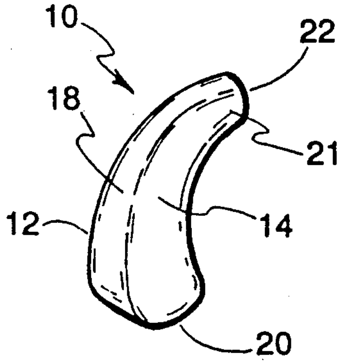
FIG. 6 is a different perspective view further illustrating a large size cover of the present invention.

As shown in FIGS. 5 and 6, the cover 10 of the present invention is formed as a hollow body from a substantially fluid impervious elastomeric material, preferably latex. While a "LARGE" size cover is illustrated, it should be understood that the cover may be formed in a variety of sizes and shapes to accommodate various conventional hearing aids, within the intended scope and content of the present invention. The illustrated "LARGE" size cover 10 possesses a shape in the unstretched condition shown in FIGS. 2, 5 and 6 which conforms to the arcuate curvature of the BTE hearing aid shown in FIG. 1. The cover 10, in the unstretched condition, is however, dimensionally smaller than the BTE hearing aid such that the cover is in a stretched condition when disposed over the BTE hearing aid, such that the cover sealingly engages the hearing aid and substantially prevents moisture and other contaminants from contacting the hearing aid. The cover 10 includes a larger closed end 20 and an opposite smaller open end 22, as well as substantially parallel, opposite, arcuate, substantially planar sidewalls 12 and 14. A convexly curved arcuate top wall 18 and a concavely curved bottom wall 16, disposed in spaced relation with the top wall 18, each extend substantially transversely between the sidewalls 12 and 14. The closed end 20 is substantially quadrilateral and extends substantially transversely between the sidewalls 12 and 14, and the top 18 and bottom 16 walls. The sidewalls 12, 14 and the top 18 and bottom 16 walls taper and smoothly merge in a neck region 21 adjacent the open end 22 to form a substantially circular opening.

Figure 2:
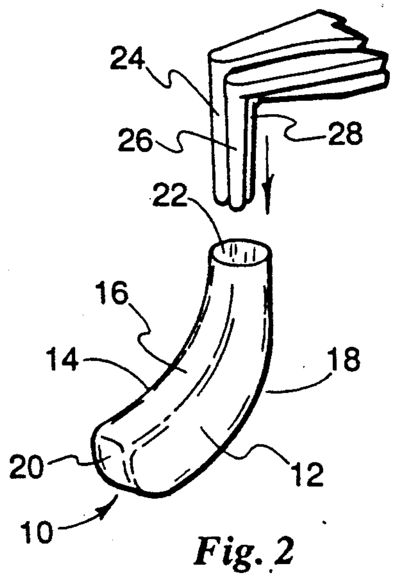
FIG. 2 is a perspective view illustrating the insertion of prongs of an expander tool into a hearing aid cover according to the present invention.
Figure 4:
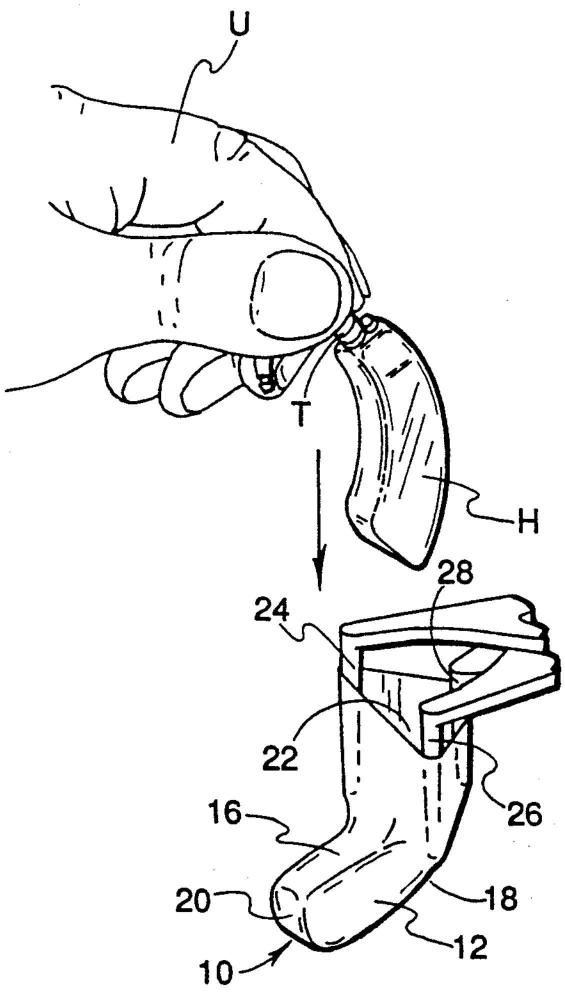
FIG. 4 is a perspective view illustrating the manner of inserting a BTE hearing aid into the cover of the present invention.
Figure 3:
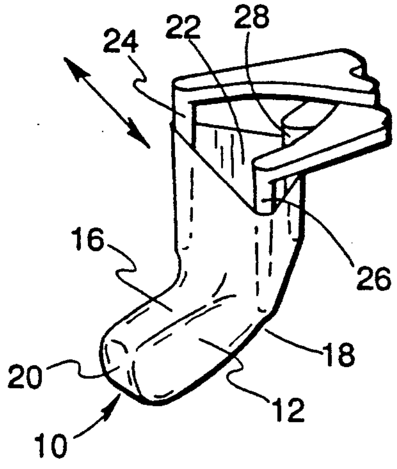
FIG. 3 is a perspective view illustrating the movement of the prongs of the expander tool apart, stretching the cover according to the present invention to a size sufficient to allow insertion of a BTE hearing aid.

With reference now to FIGS. 1-4, the manner of installing the hearing aid cover 10 of the present invention on a conventional BTE hearing aid H will now be described. The elongated right angular prongs 24, 26, 28 of an expander tool, to be described in detail hereinafter, are first inserted into the hollow interior of the cover 10 through the open end 22, as shown in FIG. 2. The expander tool is then manually manipulated by a user to move the prongs 24, 26, 28 apart, as depicted in FIG. 3, internally engaging and mechanically stretching the cover 10, and particularly the open end 22 and adjacent portion. With the user grasping the expander tool in one hand and the sound tube T of a BTE hearing aid H in the other hand U, as shown in FIG. 4, the hearing aid H is inserted, rear or battery compartment end first, into the stretched cover 10, until the open end 22 of the cover is disposed at a location adjacent the front face of the hearing aid H indicated by the phantom line L in FIG. 1. It should be noted that, during installation, the cover 10 is preferably oriented relative to the expander tool such that the bottom end 20 of the cover 10 curves away from the prongs 24, 26, 28 in order that insertion of the hearing aid H into the expanded cover 10 is not encumbered by interference between the two hands of the user, or by interference between the illustrated hand U of the user and the expander tool.

The microphone M and sound tube T remain exposed when the cover 10 is in place, projecting through the open end 22 of the cover 10. The flexible nature of the latex material forming the cover 10 allows a user to adjust the volume wheel V and switch S through the cover 10 while the cover 10 remains in place. The cover 10 also provides additional security against removal of a battery disposed in the battery compartment of the hearing aid H by a small child. When it is necessary to change batteries, the cover 10 may be removed by merely unrolling it from the hearing aid H. Tests have shown that the cover 10, when installed on a BTE hearing aid, still allows sufficient air to reach the hearing aid for the proper operation of air activated zinc batteries. This is believed to be due to the entry of air through pores in the latex which are too small to allow passage of water molecules. The cover 10 may then be replaced with a new cover or saved and reused. The covers 10 are of a very inexpensive construction, and so may be frequently changed and disposed for hygienic purposes.

Figure 7:
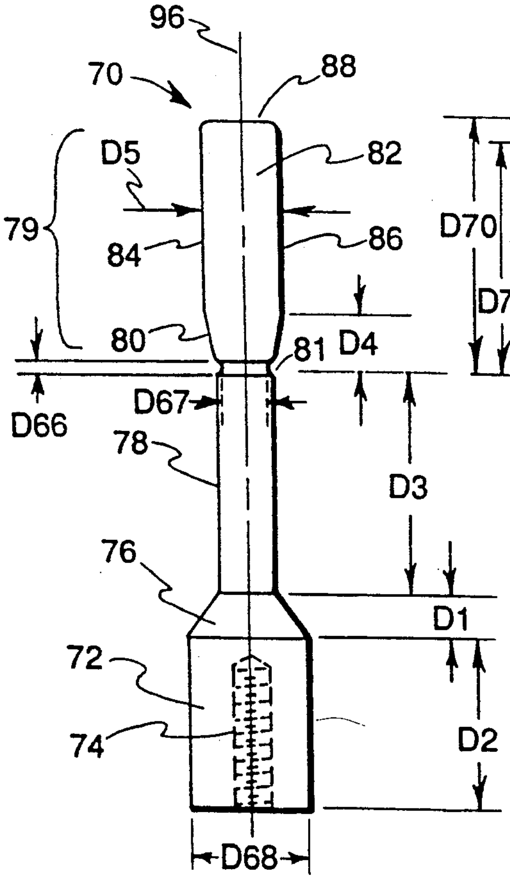
FIG. 7 is a front elevational view illustrating a large size former used in a latex dip method of making the large size cover of the present invention.
Figure 8:
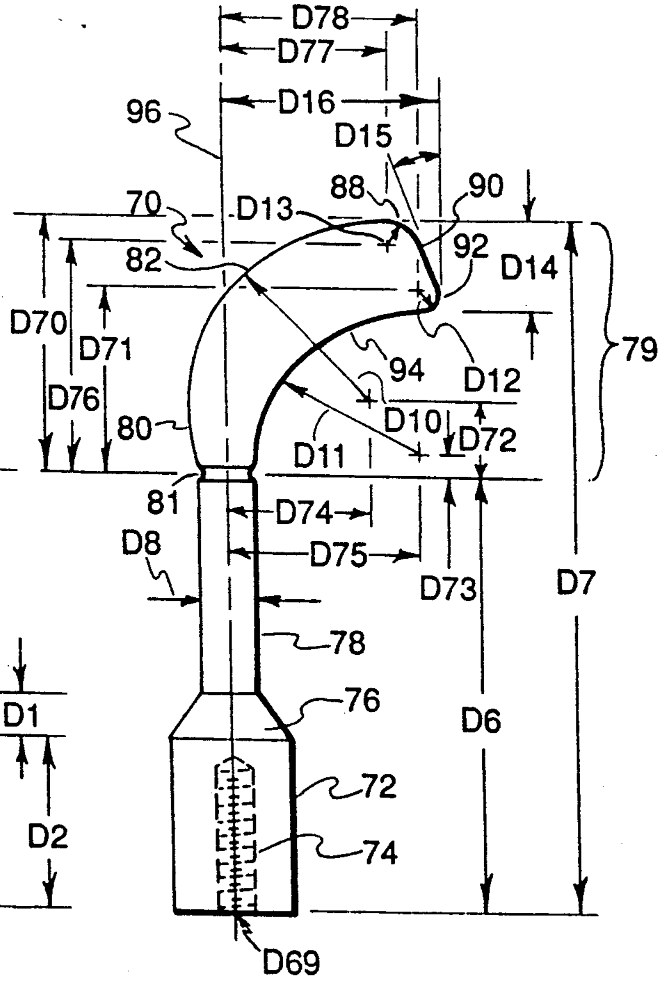
FIG. 8 is a side elevational view illustrating the large size former used in a latex dip method of making the large size cover of the present invention.

FIGS. 7 and 8 illustrate a former 70 utilized in the preferred latex dip method of forming the "LARGE" size cover 10 of the present invention. The former 70, which may be machined from aluminum bar stock having a central longitudinal axis 96, includes an enlarged diameter cylindrical end portion 72 in which a central axially extending blind threaded bore 74 is provided for the purpose of securing the former 70 to a vertically movable support of an automated latex dip forming device. The cylindrical end portion 72 is connected to an elongated reduced diameter cylindrical stem 78 by a frusto conical tapered portion 76. The stem 78 is connected to the head portion 79 of the former 70 in a taper blend region 80 in which opposite, arcuate, spaced, parallel sidewalls 84 and 86, and arcuate convexly curved top wall 82 and arcuate concavely curved bottom wall 94 merge smoothly into the cylindrical stem 78. The taper blend region 80 of the former head 79 produces the tapered neck region 21 of the cover 10 adjacent the open end 22 (FIGS. 5 and 6). A groove 81 separates the former head 79 from the stem 78, and defines the dip level of the former 70 in the liquid latex during manufacture of the cover 10. Radiused corners 88 and 92 are formed, respectively, at the junctions of substantially planar, obliquely inclined end wall 90 with the arcuate top 82 and bottom 94 walls.

Dimensions of an example embodiment of a former 70 for producing a cover 10 of a "Large" size suitable for use with BTE hearings aids of the following example makes and model numbers, MAICO #525, OTICON E38P, PHILLIPS P53A, SIEMENS 604, as well as equivalent BTE hearing aids by other manufacturers, are set forth in the following table.

| | LARGE SIZE COVER | |
|---|---|---|
| REFERENCE | DIMENSION (inches) | DESCRIPTION |
| D1 | 0.50 | Length of frusto conical tapered portion 76. |
| D2 | 1.00 | Length of cylindrical portion 72. |
| D3 | 0.875 | Length of reduced diameter cylindrical stem 78 to midline of groove 81. |
| D4 | 0.750 | Length of taper blended portion 80. |
| D5 | 0.400 | Thickness of former head 79. |
| D6 | 2.375 | Axial distance from end of cylindrical portion 72 to midline of groove 81. |
| D7 | 4.032 | Total length of former. |
| D8 | 0.300 | Diameter of reduced diameter cylindrical stem 78. |
| D10 | 1.125 | Radius of outer arcuate Wall 82. |
| D11 | 0.900 | Radius of inner arcuate wall 94. |
| D12 | 0.15625 | Radius of corner 92 at junction of inner arcuate wall 94 and end wall 90. |
| D13 | 0.21875 | Radius of corner 88 at junction of outer arcuate wall 82 and end wall 90. |
| D14 | 0.550 | Width of former head. |
| D15 | 10 degrees | Inclination of end wall 90 from vertical. |
| D16 | 1.250 | Maximum radial extent of former head from centerline 96. |
| D66 | 0.062 | Width of groove 81. |

-continued

| LARGE SIZE COVER | | |
|---|---|---|
| REFERENCE | DIMENSION (inches) | DESCRIPTION |
| D67 | 0.270 | Minimum diameter of groove 81. |
| D68 | 0.625 | Diameter of cylindrical portion 72. |
| D69 | 0.25-20 | Dimensions of threaded bore 74. |
| D70 | 1.657 | Length of former head 79 from midline of groove 81 to corner 88. |
| D71 | 1.175 | Distance from midline of groove 81 to horizontal reference axis. |
| D72 | 0.450 | Distance from midline of groove 81 to horizonal reference axis. |
| D73 | 0.110 | Distance from midline of groove 81 to horizontal reference axis. |
| D74 | 0.910 | Radial distance from central axis 96 to vertical reference axis. |
| D75 | 1.10 | Radial distance from central axis 96 to vertical reference axis. |
| D76 | 1.40 | Distance from midline of groove 81 to horizontal reference axis. |
| D77 | 1.05 | Radial distance from central axis 96 to vertical reference axis. |
| D78 | 1.09 | Radial distance from central axis 96 to vertical reference axis. |

Figure 15:
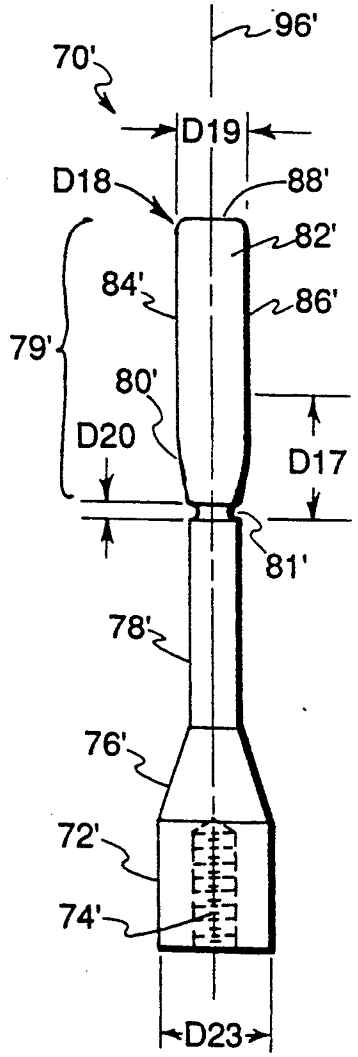
FIG. 15 is a front elevational view illustrating a medium size former used in a latex dip method of making a medium size cover of the present invention.
Figure 16:
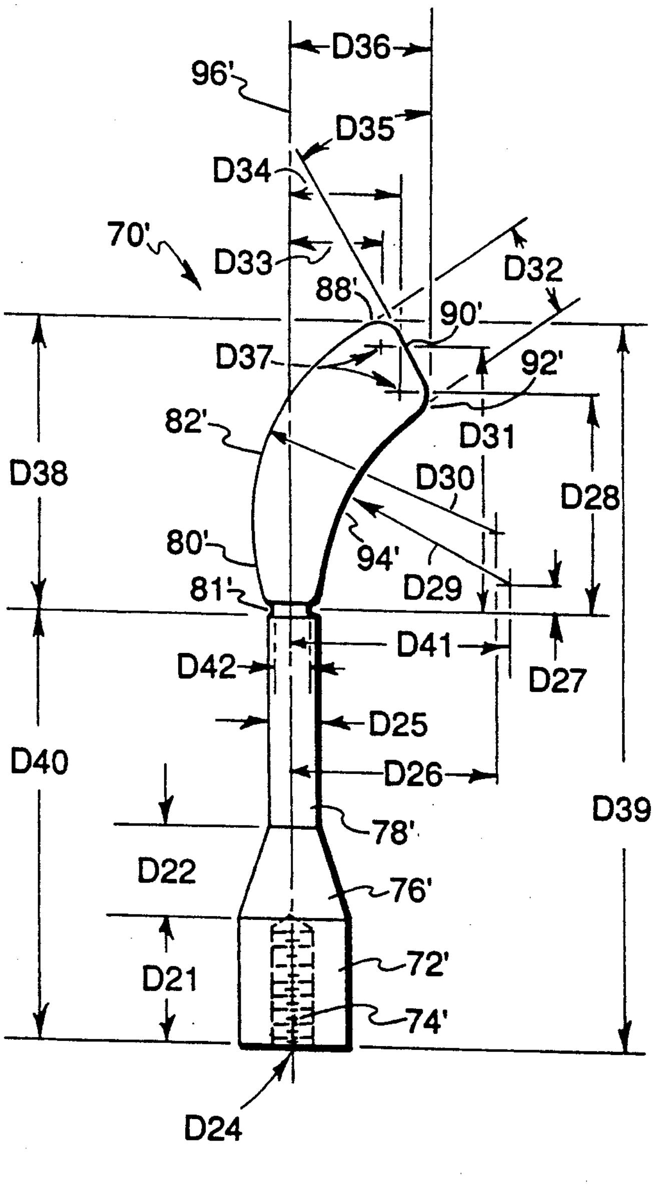
FIG. 16 is a side elevational view illustrating the medium size former used in a latex dip method of making the medium size cover of the present invention.

Dimensions of an example embodiment of a former 70', illustrated in FIGS. 15 and 16, for producing a cover 10 of a "Medium" size suitable for use with BTE hearings aids of the following example makes and model numbers, MAICO S425, OTICON E30P, PHILLIPS P49, SIEMENS 284PP, as well as equivalent BTE hearing aids by other manufacturers, are set forth in the following table.

| MEDIUM SIZE COVER | | |
|---|---|---|
| REFERENCE | DIMENSION (inches) | DESCRIPTION |
| D17 | 0.750 | Length of taper blended portion 80' |
| D18 | 0.0625 | Typical corner radius. |
| D19 | 0.390 | Thickness of former body. |
| D20 | 0.062 | Width of groove 81'. |
| | 1.00 | Length of cylindrical portion 72'. |
| D2 | 0.50 | Length of frusto conical tapered portion 76'. |
| D23 | 0.625 | Diameter of cylindrical portion 72'. |
| D24 | 0.25-20 | Dimensions of thread bore 74'. |
| D25 | 0.290 | Diameter of reduced diameter cylindrical stem 78'. |

-continued

| MEDIUM SIZE COVER | | |
|---|---|---|
| REFERENCE | DIMENSION (inches) | DESCRIPTION |
| D26 | 1.160 | Radial distance from vertical centerline 96' of former 70' to vertical reference axis. |
| D27 | 0.150 | Axial distance from midline of groove 81' to horizontal reference axis. |
| D28 | 1.250 | Axial distance from midline of groove 81' to horizontal reference axis. |
| D29 | 1.10 | Radius of inner arcuate wall 94'. |
| D30 | 1.375 | Radius of outer arcuate wall 82'. |
| D31 | 1.525 | Axial distance from midline of groove 81' to horizontal reference axis. |
| D32 | 0.55 | Width of former head. |
| D33 | 0.512 | radial distance from vertical centerline 96' to vertical reference axis. |
| D34 | 0.625 | Radial distance from vertical centerline 96' to vertical reference axis. |
| D35 | 30 degrees | Inclination of end wall 90' from vertical. |
| D36 | 0.820 | Maximum radial extent of former head from centerline 96'. |
| D37 | 0.15625 | Radius of corner 88' at junction of outer arcuate wall 82' and end wall 90' and radius of corner 92' at junction of inner arcuate wall 94' and end wall 90'. |
| D38 | 1.657 | Length of former head from midline of groove 81' to corner 88'. |
| D39 | 4.032 | Total length of former. |
| D40 | 2.375 | Axial distance from end of cylindrical portion 72' to midline of groove 81'. |
| D41 | 1.240 | Radial distance from centerline 96' to vertical reference axis. |
| D42 | 0.260 | Minimum diameter of groove 81'. |

Figure 17:
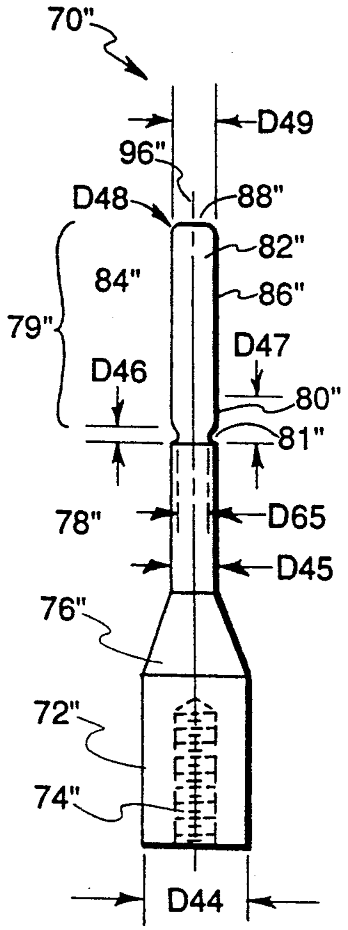
FIG. 17 is a front elevational view illustrating a small size former used in a latex dip method of making a small size cover of the present invention.
Figure 18:
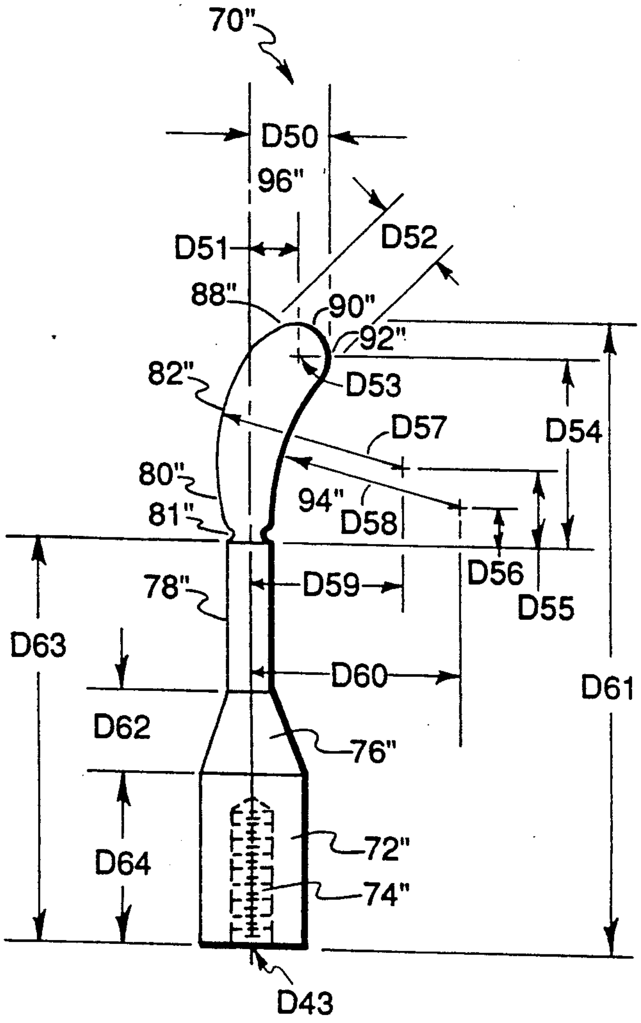
FIG. 18 is a side elevational view illustrating the small size former used in a latex dip method of making a small size cover of the present invention.

Dimensions of an example embodiment of a former 70", illustrated in FIGS. 17 and 18, for producing a cover 10 of a "Small" size suitable for use with BTE hearings aids of the following example makes and model numbers, MAICO G117, OTICON E-40, PHILLIPS P-53-A, SIEMENS 264PP-PC, as well as equivalent BTE hearing aids by other manufacturers, are set forth in the following table.

| REFERENCE | DIMENSION (inches) | DESCRIPTION |
|---|---|---|
| D43 | 0.25-20 | Dimensions of threaded bore 74" |

-continued

| REFERENCE | DIMENSION (inches) | DESCRIPTION |
|---|---|---|
| D4 | 0.625 | Diameter of cylindrical portion 72''. |
| D45 | 0.270 | Diameter of reduced diameter cylindrical stem 78''. |
| D46 | 0.062 | Width of groove 81''. |
| D47 | 0.300 | Length of taper blended portion 80''. |
| D48 | 0.0625 | Typical corner radius. |
| D49 | 0.270 | Thickness of former body. |
| D50 | 0.4875 | Maximum radial extent of former head from centerline 96''. |
| D51 | 0.300 | Radial distance from vertical centerline 96'' to vertical reference axis. |
| D52 | 0.44 | Width of former head. |
| D53 | 0.1875 | Radius of end wall 90'' of former head. |
| D54 | 1.1625 | Axial distance from midline of groove 81'' to horizontal reference axis. |
| D55 | 0.475 | Axial distance from midline of groove 81'' to horizontal reference axis. |
| D56 | 0.225 | Axial distance from midline of groove 81'' to horizontal reference axis. |
| D57 | 1.125 | Radius of outer arcuate wall 82''. |
| D58 | 1.125 | Radius of inner arcuate wall 94''. |
| D59 | 0.925 | Radial distance from vertical centerline 96' of former 70' to vertical reference axis. |
| D60 | 1.250 | Radial distance from centerline 96'' to vertical reference axis. |
| D61 | 3.725 | Total length of former. |
| D62 | 0.50 | Length of frusto conical tapered portion 76''. |
| D63 | 2.375 | Axial distance from end of cylindrical portion 72' to midline of groove 81'. |
| D64 | 1.00 | Length of cylindrical portion 72''. |
| D65 | 0.240 | Minimum diameter of groove 81''. |

Figure 9:
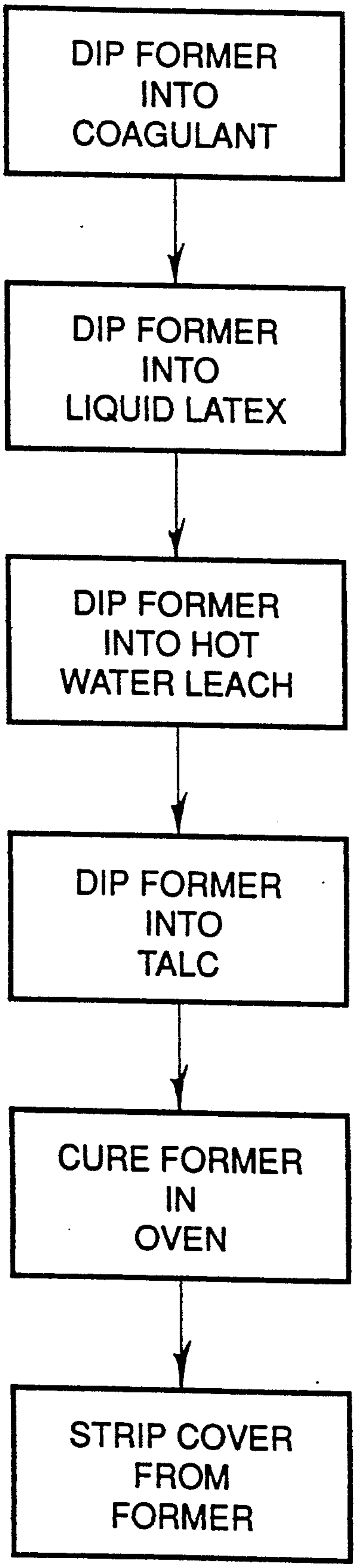
FIG. 9 is a block diagram illustrating the sequential steps of a latex dip method of making the cover of the present invention.
Figure 10:
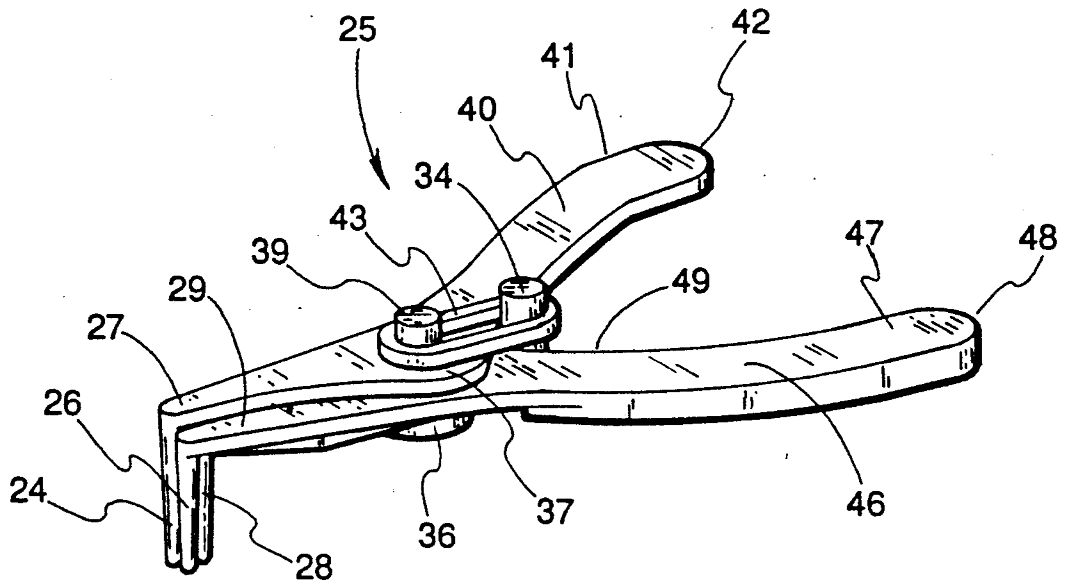
FIG. 10 is a top perspective view illustrating the expander tool for use in installing the hearing aid cover of the present invention, with the prongs in a closed position.
Figure 11:
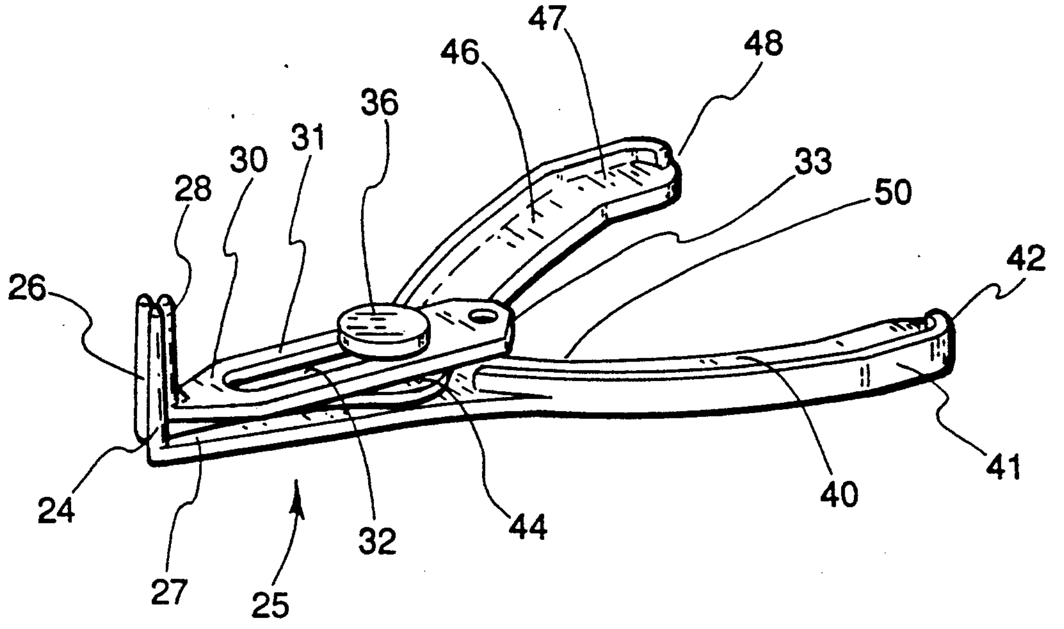
FIG. 11 is a bottom perspective view illustrating the expander tool for use in installing the hearing aid cover of the present invention, with the prongs in a closed position.

With reference to FIG. 9, the manner of making the cover 10 according to the present invention will now be described in detail. The preferred method of producing the covers 10 involves a latex dip procedure similar to the conventional method of forming a variety of medical latex articles such as surgical gloves, condoms, anesthesia bags, syringe needle covers, etc. Initially, at least one and preferably a larger number of suitable formers 70 (or 70' or 70'') are secured to the vertically reciprocal dip supports of a conventional latex dip forming machine. Alteratively, stationary dip supports may be employed in conjunction with vertically reciprocal vats. The formers 70 are then dipped into a vat containing a conventional liquid coagulant mixture for latex maintained at about room temperature for a dwell time of about ten seconds. A preferred coagulant mixture is 80% water, 10% calcium nitrate, 5% refined talc and 5% thickening agent. After being coated with the coagulant, the formers 70 are dipped into a vat containing a natural liquid latex mixture maintained at about room temperature for a dwell time of fifteen seconds. A preferred latex mixture is available from General Latex Corporation of Ashland, Ohio, and consists of 41% water, 50% pure natural latex, 3% ammonia, 3% antioxidant agent and 3% antioxidant agent to resist deterioration of the resulting cover due to ozone exposure. While the compositions and other process parameters set forth herein are suitable for use in forming a cover 10 having a natural latex color, it is contemplated that the cover 10 may be formed in a wide variety of different colors within the scope of the present invention. In this context, desired colors may be achieved by adding various conventional pigments to the latex mixture, which also may necessitate some minor adjustments in the process parameters. The coagulant promotes the formation of a latex skin, or coating on the heads 79 of the formers 70. After withdrawal from the latex vat, the formers 70 are allowed to stand at room temperature for a period of two minutes after which they are immersed in a hot water leach tank maintained at a temperature of 150 degrees Fahrenheit for a period of four minutes. The hot water extracts the coagulant and other impurities from the pores of the latex, which if allowed to remain, can promote rapid deterioration or "aging" of the finished covers 10. After withdrawal from the hot water leach vat, the formers 70 are briefly dipped in a liquid talc solution maintained at about room temperature for the purpose of leaving a talc powder film on the exterior surface of the latex coating the formers 70 to prevent the latex covers 10 from sticking to one another. After dipping in the talc vat, the formers 70 are moved to a curing oven, where the latex covers 10 cure for a period of thirty minutes at a temperature of 220 degrees Fahrenheit. When curing is complete, the formers 70 are removed from the oven and allowed to cool to room temperature, after which the finished covers 10 are manually stripped from the formers 70, a process which may be facilitated, if necessary, by directing a compressed air stream along the stem 78 of the former 70 and into the open end 22 of the cover 10 to release the cover 10 from the head 79 of the former 70.

Figure 12:
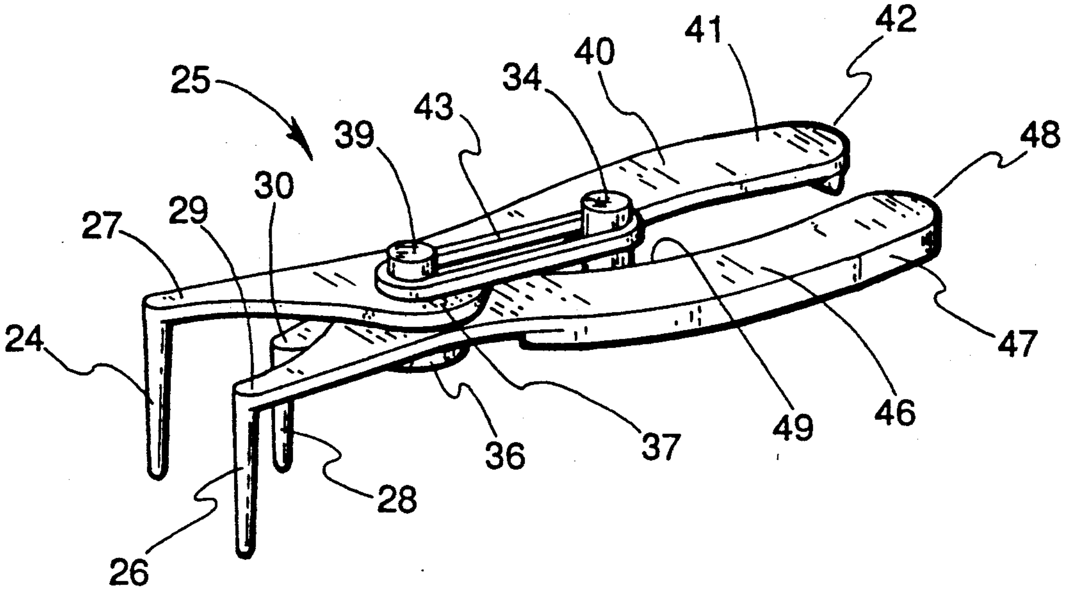
FIG. 12 is a top perspective view illustrating the expander tool for use in installing the hearing aid cover of the present invention, with the prongs in an open position.
Figure 13:
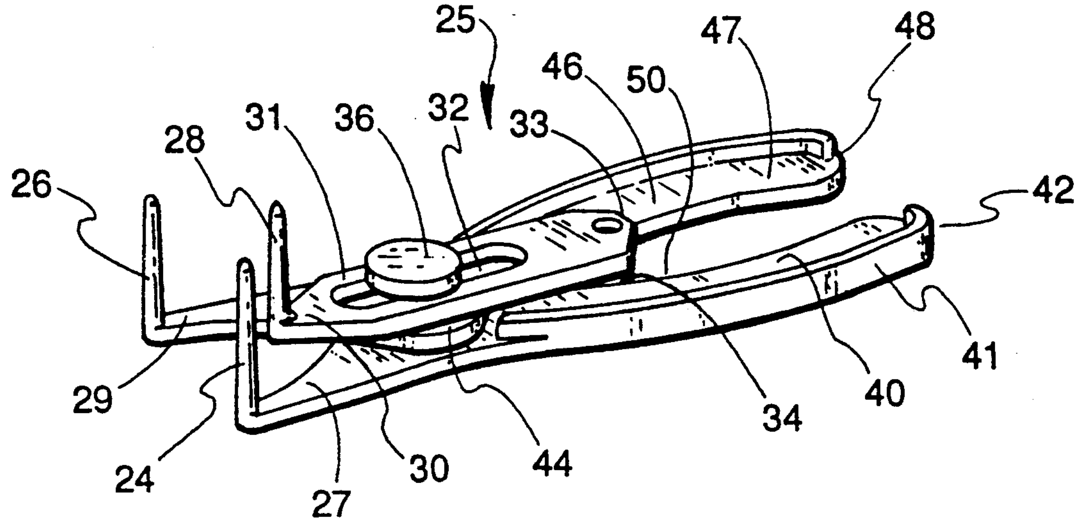
FIG. 13 is a bottom perspective view illustrating the expander tool for use in installing the hearing aid cover of the present invention, with the prongs in an open position.
Figure 14:
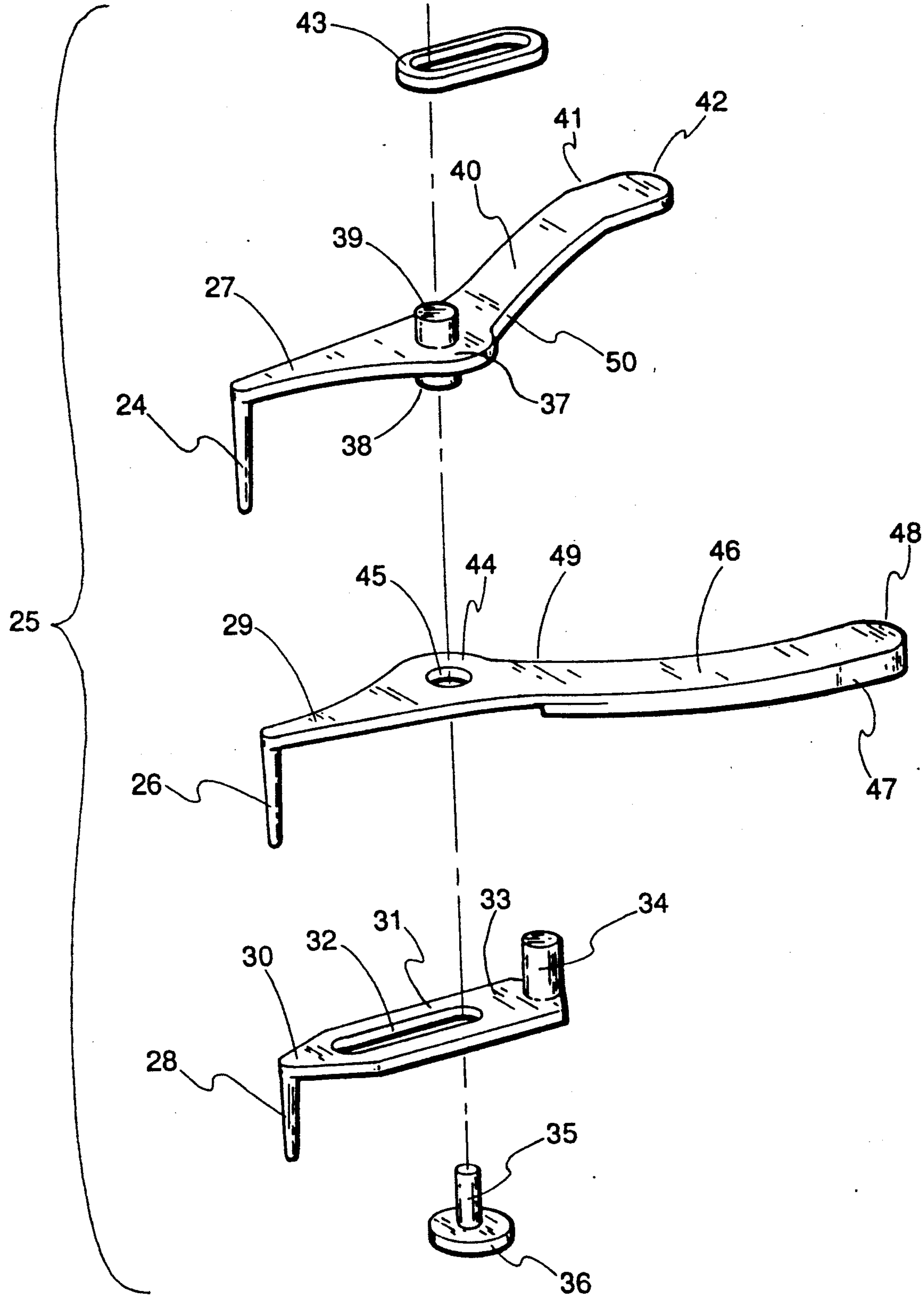
FIG. 14 is an exploded perspective view illustrating the expander tool for use in installing the hearing aid cover of the present invention.

With reference to FIGS. 10-14, a preferred expander tool 25 for use in installing the covers 10 of the present invention on BTE hearing aids will now be described. The expander tool 25 includes three conically tapering prongs 24, 26, 28 having free distal smaller diameter end portions which converge into abutment within a small space to facilitate insertion into the smaller open end 22 of the cover 10, as shown in FIG. 2. The prong 24 is perpendicularly connected to a planar, tapering end portion 27 of a first integrally formed handle member 40. The handle member 40 includes an enlarged substantially central arcuate portion 37 in which a hollow cylindrical bushing is molded. The bushing includes a closed end 39 and an open end 38, which each project transversely above and below, respectively, the handle member 40. A rounded end portion 42 of the handle member 40 is connected by an acutely angled bend portion 41. The prong 26 is perpendicularly connected to a planar, tapering end portion 29 of a second integrally formed handle member 46. The handle member 46 includes an enlarged substantially central arcuate portion 44 through which a circular aperture 45 extends. A rounded end portion 48 of the handle member 46 is connected by an acutely angled bend portion 47. The prong 28 is perpendicularly connected to a planar, tapering end portion 30 of a slide bar 31. A longitudinally extending slot 32 having opposite rounded ends is formed through the slide bar 31. A cylindrical pin 34 is perpendicularly formed on an opposite face and at an opposite end of the slide bar 31 with respect to the prong 28. In an assembled condition, the open end 38 of the bushing formed centrally in the handle member 40 is inserted through the aperture 45 disposed in the handle member 46, such that the handle members 40 and 46 are disposed in parallel, partial overlying relation and are mounted for relative reciprocal pivotal movement about the central longitudinal axis of the aperture 45. The reduced diameter cylindrical shank 35 of a retaining pin is inserted through the slot 32 in the slide bar 31, through the aperture 45 in the handle member 46, and into a press fit engagement within the open end 38 of the bushing formed in the handle member 40. The enlarged diameter circular head 36 of the retaining pin retains the parts in assembled condition, while allowing reciprocal sliding movement of the slide bar 31. A rubber band 43, preferably of a high grade medical latex of the type used in orthodontic applications, is stretched over the closed upper end 39 of the bushing and the pin 34 connected to the slide bar 31. Circumferential grooves may be provided in one or both of the upper bushing end 39 and pin 34 to prevent axial displacement of the rubber band 43. The rubber band 43 biases the slide bar 31 to a forward position, causing engagement of the pin 34 with cam surfaces 49 and 50 formed by inner side edges of the handle members 46 and 40, respectively, causing the handle members 46 and 50 to pivot to the closed position illustrated in FIGS. 10 and 11, and disposing the prongs 24, 26 and 28 into closely adjacent relation. When it is desired to expand the cover 10 as illustrated in FIGS. 3 and 4, an individual holds the tool 25 in the palm of one hand in a manner analogous to the grasping of a pair of pliers. The individual then squeezes the handle members 40 and 46 together, against the bias of the rubber band 43, as shown in FIGS. 12 and 13. As the handle members 40 and 46 are pivoted together, the cam surfaces 49 and 50 engage the pin 34, effecting rearward movement of the pin 34, slide bar 31 and prong 28. All of the components of the expander tool 25, excluding the rubber band 43, are preferably injection molded from a glass reinforced nylon material, which provides for extremely high strength, and also provides natural lubricity for a very smooth working action of the tool.

It is to be understood, however, that even though numerous characteristics and advantages of the present invention have been set forth in the foregoing description, together with details of the structure and function of the invention, the disclosure is illustrative only, and changes may be made in detail, especially in matters of materials, shape, size and arrangement of parts within the principles of the invention to the full extent indicated by the broad general meaning of the terms in which the appended claims are expressed.

What is claimed is:

1. A cover for a BTE hearing aid, comprising:

a hollow body formed from a substantially fluid impervious elastomeric material;

said body possessing a shape in an unstretched condition conforming to an arcuate curvature of a BTE hearing aid and including a larger closed end and an opposite smaller open end;

said body being dimensionally smaller than a BTE hearing aid such that said body is in a stretched condition when disposed thereover, whereby said cover substantially prevents moisture and other contaminants from contacting the hearing aid.

2. The cover of claim 1, wherein said body includes substantially parallel, opposite, arcuate, substantially planar sidewalls.

3. The cover of claim 2, further comprising a convexly curved arcuate top wall extending substantially transversely between said sidewalls.

4. The cover of claim 3 further comprising a concavely curved arcuate bottom wall extending substantially transversely between said sidewalls, said bottom wall disposed in spaced relation with said top wall.

5. The cover of claim 4, wherein said closed end is substantially quadrilateral and extends substantially transversely between said sidewalls and said top and bottom walls.

6. The cover of claim 4, wherein said sidewalls and said top and bottom walls taper and smoothly merge at said open end to form a substantially circular opening.

7. The cover of claim 1, further comprising stretching means for mechanically stretching said body to a size sufficient to allow insertion of a BTE hearing aid.

8. The cover of claim 7, wherein said stretching means comprise a tool possessing a plurality of elongated prongs dimensioned for insertion into said body and means for selectively moving said prongs apart and together.

9. The cover of claim 1, wherein said elastomeric material comprises latex.

* * * * *